United States Patent [19]

O'Toole

[11] Patent Number: 5,334,242

[45] Date of Patent: Aug. 2, 1994

[54] BAKING STONE AND METHOD OF MANUFACTURE THEREOF

[76] Inventor: Mark J. O'Toole, 7713 W. 158th Ct., Orland Park, Ill. 60462

[21] Appl. No.: 878,097

[22] Filed: May 4, 1992

[51] Int. Cl.⁵ .................... C04B 14/38; C04B 14/00
[52] U.S. Cl. .................... 106/711; 106/724; 106/737; 106/812; 106/823
[58] Field of Search ............ 106/711, 713, 724, 737, 106/823, 643, 802, 812, 819

[56] References Cited

U.S. PATENT DOCUMENTS

| | | | |
|---|---|---|---|
| 4,115,135 | 9/1978 | Geoman | 106/711 |
| 4,127,417 | 11/1978 | Okada et al. | 106/711 |
| 4,229,225 | 10/1980 | Kraszewski et al. | 106/643 |
| 4,293,343 | 10/1981 | Shannon | 106/711 |
| 4,363,666 | 12/1982 | Johnson et al. | 106/711 |
| 4,999,056 | 3/1991 | Rasmussen | 106/737 |

*Primary Examiner*—Mark L. Bell
*Assistant Examiner*—Michael Marcheschi
*Attorney, Agent, or Firm*—Baker & McKenzie

[57] ABSTRACT

An improved composition for baking stones for use in commercial ovens and a method of manufacture of the improved baking stones are disclosed. The baking stone composition is asbestos-free, non-hazardous and is ideal for commercial ovens designed for baking pizza and bread. The improved composition includes portland cement, mortar or mason sand, glass fiber strands, water and a plasticizer. A novel method of manufacture is also disclosed which includes the preferred mixing speeds, mixing times, vibrating speeds, vibrating times and cure times.

2 Claims, No Drawings

BAKING STONE AND METHOD OF MANUFACTURE THEREOF

This invention relates to baking stones for use in commercial ovens and specifically to baking stones for ovens designed to cook pizza and bread. The improvement contributed by this invention is an asbestos-free formula for the manufacture of commercial baking stones and an improved method of manufacture of baking stones made in accordance with the improved asbestos-free formula.

BACKGROUND OF THE INVENTION

The commercial oven industry has never fully recovered from discovery that asbestos is extremely hazardous to human health and its subsequent banishment in 1985. Prior to that time, baking stones used as oven decks in commercial ovens were made from materials broadly described as transite. Transite is a hydraulically pressed cement-asbestos board and was mass produced from the 1940's until 1985. Since the production of transite was prohibited after the discovery of the harmful effects of asbestos, the commercial oven industry has yet to find an equivalent baking stone which provides the same baking qualities as transite despite the introduction of numerous asbestos-free baking stones.

The quality most desired in a baking stone is even or consistent thermal conductivity through the stone. If the stone conducts heat unevenly, the bottom portion of food resting on the stone will not cook evenly. For example, a pizza crust may be burned in some areas and actually undercooked in others. Of course, the baking stone must be resistant to cracking and delamination despite years of use at temperatures exceeding 500° F.

Transite was manufactured from a combination of portland cement and asbestos fibers. Other manufacturers have searched for suitable fibers to combine with portland cement in order to achieve the desired baking qualities of transite. One such attempt is represented by the asbestos-free transite products. These products are manufactured from selected asbestos-free fibers and portland cement. The asbestos-free transite is not a satisfactory replacement for asbestos-containing transite because of surface cracking, delamination and uneven thermal conductivity through the asbestos-free transite stone.

Another product which was developed to replace transite is sold under the name promassal. Promassal is a mixture of calcium silicate hydrates, calcium silicate fillers, phyllosilicate fillers, natural organic fillers and residual quartz. However, promassal is characterized by the same inadequacies that characterize asbestos-free transite products. Namely, promassal baking stones are prone to surface cracking, delamination and uneven thermal conductivity through the stone. Specifically, promassal is not suitable for the higher temperatures used in baking pizza.

Currently, the material most commonly used for commercial oven baking stones is sold under the name cordierite. Cordierite is a magnesium-aluminum-silicate material. However, the cordierite stone is fragile and does not provide a consistent even cooking surface as required for hearth baked goods such as bread and pizza.

Thus, there is a need for a asbestos-free baking stone that would provide all of the benefits of the now discontinued asbestos-containing transite. This need has been felt since the abandonment of asbestos-containing products in the mid 1980's. The improvement contributed by the present invention solves the above illustrated problems and provides a baking stone that performs as well or better than the asbestos-containing transite. Further, the method of manufacture of the improved baking stone is a novel process in itself and enables the manufacturer to mass produce the improved baking stone.

BRIEF DESCRIPTION OF THE INVENTION

This invention provides an improved composition for a baking stone and a novel process for the manufacture thereof. The baking stone is made from a mixture of cement, mortar or mason sand, glass fibers, water and a plasticizer. The cement material may be a typical portland cement, such as types I, II, or III portland cement, calcium silicate or a combination thereof. The mortar may be standard mortar material or mason sand. The glass fibers are preferably about ½ inch in length and are preferably made from Nippon Electric Alkali Resistant Glass Fiber (ARGF) chopped strands. The water may be tap water and need not be distilled. The plasticizer must be compatible with the above components and is preferably Rheobuild 1,000 Super Plasticizer.

To manufacture the improved baking stone, the cement, mortar and water are mixed for one minute in a high speed disperser. The plasticizer is added and mixed for about thirty seconds. The glass fiber is added and slowly mixed at slow speeds for about thirty seconds. The batch is then poured into a mold and the mold is then vibrated at high speeds for about two minutes. After troweling or smoothing the surface, the stone is allowed to cure for twenty-four hours before being removed from the mold. The stone is then removed from the mold and allowed to cure for thirty days or longer before shipment.

Therefore, it is an object of the present invention to provide an improved baking stone that performs as well as or better than the asbestos-containing baking stones used in the past.

Another object of the present invention is to provide a baking stone that is highly resistant to surface cracking, highly resistant to delamination and provides even thermal conductivity through the stone.

Another object of the present invention is to provide a novel process for the manufacture of an improved baking stone.

DETAILED DESCRIPTION OF THE INVENTION

In its broadest form, the composition of the present invention in weight percent of a just-mixed batch is as follows:

Portland cement—from on the order of about 30% to about 75%;

Mortar or mason sand—from on the order of about 20% to about 60%;

Glass fibers—from on the order of about 1% to about 3%;

Water—from on the order of about 10% to about 30%; and

Plasticizer—from on the order of about 0.3% to about 1.5%.

The portland cement is necessary to provide structural strength and rigidity to the final product. If much less than about 30% of cement is used in the just-mixed batch, the requisite strength and rigidity, and hence the desired working life, will not be achieved. Further, baking stones made with too much mortar or sand and too little cement will shrink upon heating. If much above 75% cement is used in a just-mixed batch, the additional cement is not necessary and the economics of the product are adversely affected. Aside from the glass fibers, cement is the most expensive component of the baking stone. About 49% of type I low alkali portland cement is preferred in conjunction with other preferred amounts of a just-mixed batch as discussed below.

Because sand or mortar is cheaper than cement, it is preferable to use as much mortar or sand as possible without compromising the structural integrity or physical properties of the baking stone. The preferred ratio of cement to mortar or sand is about 50:34. If the cement to mortar or sand ratio drops to 30:54, the thermal conductivity of the stone is compromised because sand is an insulator, and consequently, a poor thermal conductor. Further, too much sand will decrease the strength of the stone.

If the cement to sand ratio exceeds 70:14, the stone will be expensive to manufacture and will shrink upon heating as discussed above. Also, too little sand reduces the abrasive strength of the stone; the surface of the stone will be less resistant to wear and tear and will have a shorter working life. In a just-mixed batch, the mortar or sand content should range from about 20% to about 60%. The preferred mortar or sand content of a just-mixed batch is about 33%.

The glass fibers act as capillaries that hold the cement together as the stone is heated. Without the fibers, the stone would crack at high temperatures. Due to their high density, glass fibers present in excess of 3% would inhibit the mixing of the cement slurry and would not allow the batch to settle. Glass fibers in an amount less than 1% will not provide the requisite structural integrity. The preferred glass fiber is Nippon Electric Alkali Resistant Glass Fibers (ARGF) cut into ¼ inch lengths. The preferred amount of ARGF in a just-mixed batch is 1.95% in conjunction with the preferred amounts discussed below. Another supplier of glass fibers is Pilkington of England.

Water is necessary for mixing the cement and mortar or sand. Drinkable tap water is adequate and distilled or purified water is not required. An excess of 30% water at mixing requires longer cure times and causes the cured baking stone to both shrink and crack at the edges of the stone. Less than 10% water at mixing will not provide an adequate slurry and will therefore adversely affect the cementation of the ingredients. The preferred amount of water is about 15.64% at mixing in conjunction with the other preferred amounts discussed below.

The plasticizer is employed to give early strength to the baking stone and allows the stone to be handled after just twenty-four hours of curing. The preferred plasticizer is Rheobuild 1000 Super Plasticizer. An excess of 1.5% (25 oz.) would adversely effect the economics of the finished product without providing any added benefit and less than 0.3% (5 oz.) would not provide the desired effects. The preferred amount of Rheobuild 1000 Super Plasticizer is about 0.30% (5 oz.) in conjunction with the other preferred amounts discussed below.

The improved baking stone of the present invention is preferably manufactured in 1½"×24"×36" plates. To manufacture one plate of the preferred size, the preferred just-mixed composition is the following:

1. Type I low alkali portland cement—50 lbs/49%;
2. Mortar or mason sand—34 lbs/33%;
3. Nippon Electric Alkali Resistant Glass Fiber (ARGF) chopped strands, ¼" in length—2 lbs/2%;
4. Tap water (drinkable)—16 lbs/15%; and
5. Rheobuild 1000 Super plasticizer—5 oz/0.30%.

The above weight percentages are mixing weight percentages. After curing, the preferred water content will range from 6-10%. In the preferred embodiment discussed above, the amount of water in the curved stone is about 6 lbs. or 6.5%. Thus, the composition of a cured baking stone of the preferred embodiment is as follows:

1. Type I low alkali portland cement—about 54%;
2. Mortar or mason sand—about 37%;
3. Nippon Electric Alkali Resistant Glass Fiber (ARGF) chopped strands ¼" in length—about 2.2%;
4. Tap water—about 6.5%; and
5. Rheobuild 1,000 Super Plasticizer—about 0.34%.

The process for manufacturing the improved baking stones is as follows. First, the cement, mortar or sand, and water are mixed for one minute in a high speed disperser at approximately 1,100 rpm. Suitable dispersers include the DK51, DK101 and DK102 mixing systems sold by Shar Inc. of Ft. Wayne, Ind. Alternative systems are found in the VHS300 and VHS400 variable high speed dispersers sold by Schold Machine Company of Chicago, Ill. and St. Petersburg, Fla. After the cement, sand and water are mixed for one minute, the plasticizer is added and the mixture is blended for another thirty seconds. Then, the speed is reduced to about 600 rpms and the glass fibers are added to the batch. The fibers are mixed into the batch at the lower speed for approximately thirty seconds. Thus, the mixing process for 1½"×24"×36" baking stone takes approximately two minutes.

After the mixing is completed, the batch is poured into a high strength plastic mold. These molds are then placed on the vibratory tables and vibrated electrically or pneumatically for approximately two minutes. Suitable vibratory table manufacturers include Vibco, Inc. of Wyoming, R.I. and Martin Engineering Company of Neponset, Ill. These tables are used to compact and settle the slurry within the mold as well as release any air trapped in the slurry. After the mold has been vibrated for several minutes, it is transported to a work table where the exposed surface is smoothed, preferably with a trowel. The batch is then allowed to cure in the mold for twenty-four hours at room temperature conditions. After the initial twenty-four hour cure time during which the batch sets up to a degree sufficient to be self-supporting, the baking stone is then removed and cured for thirty days or longer at room temperature conditions before shipment or handling.

EXAMPLES 1-3

Baking stones were produced by the above method for the following, the amount of each component being expressed in pounds or ounces with the weight percents in parentheses:

| Component | Example 1 | Example 2 | Example 3 |
| --- | --- | --- | --- |
| Portland cement | 61 lb. (56) (Type III) | 42 lb. (41) (Type II) | 31 lb. (31) (Type I) |
| Mason sand | 22 lb. (20) | 43 lb. (42) | 53 lb. (53) |
| AGRF, ¼" in length | 3 lb. (2.7) | 1 lb. (0.97) | 2 lb. (2) |
| Tap water | 23 lb. (21) | 17 lb. (16) | 14 lb. (14)) |

-continued

| Component | Example 1 | Example 2 | Example 3 |
|---|---|---|---|
| Rheobuild 1000 Super Plasticizer | 12 oz. (0.68) | 5 oz. (0.48) | 9 oz. (0.56) |

From the foregoing description and examples, it is apparent that the objects of the present invention have been achieved. While only certain embodiments have been set forth, alternative embodiments and various modifications will be apparent to those skilled in the art. These and other alternatives are considered within the scope and spirit of the appended claims.

We claim:

1. A composition for preparing a baking stone for use at temperatures exceeding 500° F., the composition consisting of the following approximate percentages by weight:

| | |
|---|---|
| low alkali portland cement | 48–54% |
| sand | 31–37% |
| alkali resistant glass fibers | .75–1.25% |
| water | 12.5–15.5% |
| plasticizer | .25–.35% | said glass fibers having lengths from about one-half inch (½"), the mixture being free of clay, and the plasticizer not exceeding 0.4%.

2. A cured baking stone for use at temperatures exceeding 500° F., the cured baking stone having a composition consisting of:

| | |
|---|---|
| low alkali portland cement | 53–58% |
| sand | 34.5–39.5% |
| alkali resistant glass fibers | .75–1.5% |
| water | 5.5–6.5% |
| plasticizer | 0.25–0.35% | the cured baking stone being free of clay,
the glass fibers having lengths of about one-half inch (½") long, and
the plasticizer not exceeding 0.4%.

* * * * *